United States Patent [19]
Whitaker

[11] Patent Number: 4,792,324
[45] Date of Patent: Dec. 20, 1988

[54] FRICTION DRIVE BELT COMPOSED OF TWO CABLES AND A PLURALITY OF SPACERS

[76] Inventor: Ranald O. Whitaker, 4719 Squire Dr., Indianapolis, Ind. 46241

[21] Appl. No.: 330,457

[22] Filed: Dec. 14, 1981

[51] Int. Cl.$^4$ .............................................. F16G 1/00
[52] U.S. Cl. ................................... 474/237; 474/242
[58] Field of Search .............. 474/242, 244, 240, 237, 474/264, 265, 239

[56] References Cited

U.S. PATENT DOCUMENTS

| | | | |
|---|---|---|---|
| 207,452 | 8/1978 | Small | 474/240 |
| 1,175,633 | 3/1916 | Howl et al. | 474/242 |
| 1,664,335 | 3/1928 | Todd | 474/242 |
| 1,862,198 | 6/1932 | Reeves | 474/244 |
| 2,195,226 | 3/1940 | Reeves | 474/244 X |
| 2,440,818 | 5/1948 | Bouroeaux | 474/242 |
| 2,444,007 | 6/1948 | Davis | 474/265 |
| 3,821,906 | 7/1974 | Berg | 474/242 |
| 4,340,378 | 7/1982 | Russ | 474/244 |

FOREIGN PATENT DOCUMENTS

| | | | |
|---|---|---|---|
| 539498 | 8/1921 | France | 474/242 |
| 2224021 | 8/1974 | France | 474/242 |
| 158181 | 6/1920 | United Kingdom | 474/239 |
| 749105 | 1/1944 | United Kingdom | 474/265 |
| 1065232 | 9/1959 | United Kingdom | 474/265 |

*Primary Examiner*—Gary L. Smith
*Assistant Examiner*—Rodney M. Lindsey

[57] ABSTRACT

Rubberized V-belts used in early friction drives suffered from excessive losses and short wear life. Chains composed of links and pins used in later drives generate excessive noise and develop maldistribution of stress among the several links. The present invention overcomes these shortcomings by providing a belt having a cable along each edge and spacers for holding the two cables apart. The cables form the "rails of a ladder". The spacers form the "rungs"—but are much closer together. The cables carry the circumferential load. The spacers carry the axial load developed by the sheaves on the cables.

2 Claims, 1 Drawing Sheet

FRICTION DRIVE BELT COMPOSED OF TWO CABLES AND A PLURALITY OF SPACERS

BACKGROUND

V-belt drives have long been used. They drive the fans and alternators on our cars. They consist of two conical pulleys and the V-belt.

If each pulley is replaced by a pair of conical sheaves whose slopes match that of the belt—we have a continuously variable friction drive. Moving one pair of sheaves toward each other causes the belt to ride to a higher radius on that pair. Moving the other pair away from each other permits the belt to fall to a lower radius on that pair. Since the ratio of speed of the driven shaft to speed of the driving shaft is determined by the ratio of these two radii, the arrangement results in a continuously variable speed drive. It is commonly called a friction drive since it is entirely dependent on the friction between the sides of the V-belt and the sheaves.

When higher power must be transmitted, the V-belt is usually replaced by a chain composed of pins extending laterally across the chain and links extending between adjacent pins. The pins are sloped to match the slope of the sheaves.

One shortcoming of this arrangement—it generates excessive noise. Each pin strikes the sheaves a hammer blow when it comes in contact. Each pin strikes the sheaves an equivalent hammer blow when it breaks loose from the sheave. Resultant vibrations pass through the system until they reach a sounding board. There they generate objectionable acoustical noise.

A second shortcoming arises from the fact that when load is applied to the tight side of the chain it is applied at the ends of the pins instead of evenly over the length of the pins. The sheaves at the first pulley pull the ends of the pin in one direction. The links pull the center of the pin in the other. Consequently the pin bows. At the second pulley the bowing is in the opposite direction. Consequently the load is born by the outer rows of links. The middle rows may carry no load at all or may even be subjected to compression. For any given chain load a chain one be designed for which the distance between holes in the outer links is sufficiently greater than the distance between holes in the inner links that the load is evenly distributed among the links. But for either greater or lesser loads the load is again unevenly distributed. This problem of uneven distribution of load becomes particularly bothersome when vibration is considered.

This second shortcoming may be largely overcome by eliminating the center links of the chain. Place one row of links along the first edge of the chain and a second row along the second edge. However, this is not done at present.

OBJECTS OF THE INVENTION

For use in friction drives produce a belt which will—
1. Generate no noise due to discrete elements of the belt impacting the sheaves.
2. Evenly distribute the load over the load carrying members of the belt.

THE FIGURES

THE PREFERRED EMBODIMENT

Figure 1:
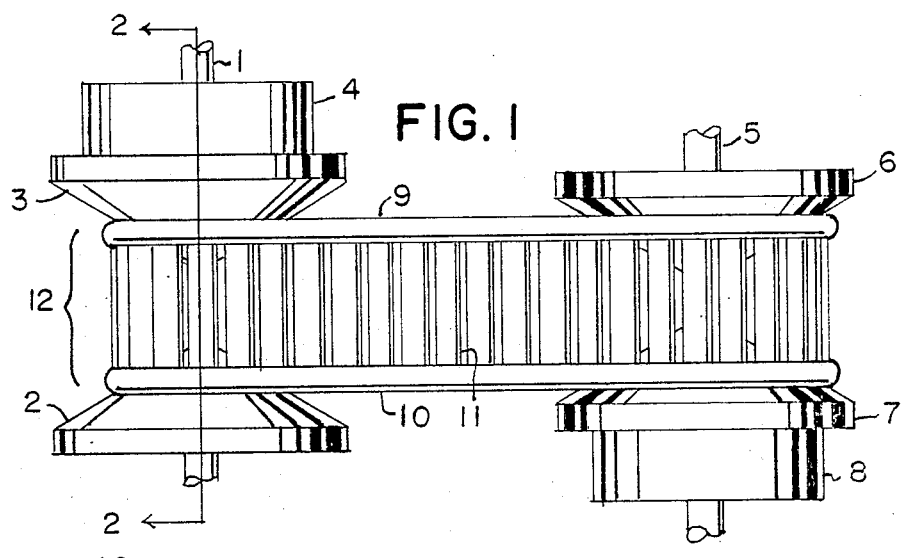
FIG. 1 is a plan view of a friction drive incorporating the present invention.

Referring to FIG. 1, driving shaft 1 is turned by a prime mover.

Fixed sheave 2 is locked to driving shaft 1.

Sliding sheave 3 is constrained to rotate with driving shaft 1 but is free to slide along it in an axial direction. It is generally moved along driving shaft 1 by an hydraulic cylinder 4.

Fixed sheave 6 is locked to driven shaft 5.

Sliding sheave 7 is constrained to rotate with driven shaft 5 but is free to slide along it in an axial direction. It is moved along driven shaft 5 by hydraulic cylinder 8.

Cables 9 and 10 constitute the edges of belt 12 wires of cables are usually steel but could be of any of a number of other metals, including copper.

Spacers of which 11 is typical constitute the web of belt 12. Pins 20 and 21 (shown in FIGS. 2 and 3) penetrate the cables.

As shown in FIG. 1, sheaves 2 and 3 are further apart than sheaves 6 and 7. Belt 12 rides at a smaller radius on sheaves 2 and 3 than it does on sheaves 6 and 7. Consequently the speed of driven shaft 5 will be less than that of driving shaft 1.

If hydraulic cylinder 4 moves sheave 3 toward sheave 2 and at the same time hydraulic cylinder 8 draws sheave 7 away from sheave 6, the speed ratio will change. The speed of driven shaft 5 will increase, become equal to that of driving shaft 1, and then become faster.

To prevent belt 12 from slipping on the sheaves it is nescessary that hydraulic cylinder 4 press sheave 3 toward sheave 2 and hydraulic cylinder 8 press sheave 7 toward sheave 6. This clamping force is transmitted from one cable to the other by spacers of which spacer 11 is typical.

Figure 4:
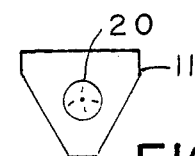
FIG. 4 is an end view of an alternate spacer.

Spacer 11 is generally a right circular cylinder. However, there is some small gain to be realized from using a wedge shaped spacer as shown in FIG. 4.

Hydraulic cylinders of the type cited are well known in the art and will not be discussed.

Figure 2:
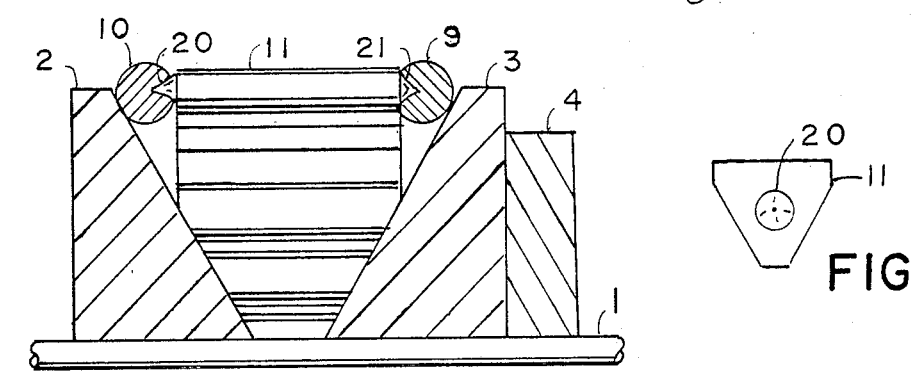
FIG. 2 is a view partially in section taken along section 2—2 of FIG. 1.
Figure 3:
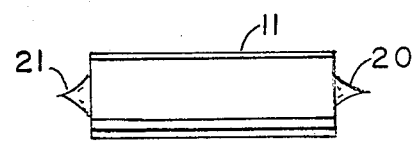
FIG. 3 is a front view of a spacer.
Figure 5:
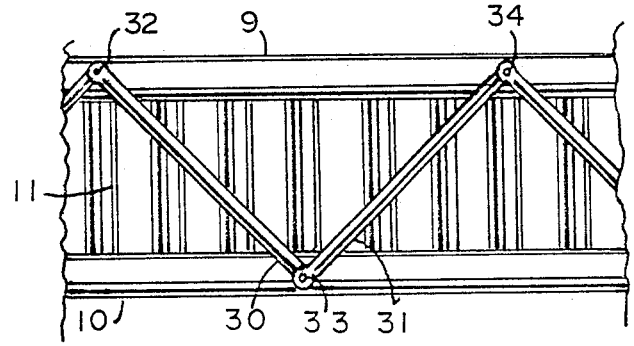

Pins 20 and 21 penetrate their respective cables as shown in FIG. 2.

Additional ties are installed on these same pins on the second side. These ties prevent one cable from getting ahead of the other—which may be caused by one cable being slightly longer than the other—consequently riding higher on the sheaves. In general the flat end surfaces of the spacers prevent the need for such ties. The ties become taught during traverse of the belt from one sheave to the other. They are slack during articulation.

A generic term for the belts and cables referred to above is "transfer element". The belt transfers power from one sheave to the other.

THE INVENTION

I was employed as a technician in the Research Center of the Chain Division of FMC Corporation. They made front-wheel drive chains for the auto industry. A continuously variable transmission is ideal for this application. However, noise and maldistribution of load on links are serious problems with the conventional drives. VanDoorn of the Netherlands has a friction drive which works well, but is rather complicated. Uses several steel belts plus a plurality of plates which ride on the belts. I was trying to come up with a good idea using just the belts. Let their edges bear against the sheaves. But the problem of the load being born by the edges of the belt appeared to have no solution. I could not whip it. A cable could be used. However, if it is large in diameter, then the flexure associated with articulation will cause early fatigue failure. If its diameter is small, then the speed ratio range becomes too limited.

Then the lightning struck. Use two small cables and install spacers between them! So that each cable sees a tapered sheave on one side and on the other sees a rotating "flat washer".

I claim:

1. A continuously variable friction drive having a pair of driving sheaves, a pair of driven sheaves, and a belt operatively associated with said sheaves;
   said belt comprising two parallel cables and a plurality of spacers;
   each of said cables having an inner surface in contact with said spacer and an outer surface diametrically opposed said inner surface; and
   said drive being adapted for causing said outer surfaces of said cables to engage said sheaves.

2. A drive as in claim 1;
   each of said spacers having a first end and a second end and each of said spacers having a first pin extending from said first end of said spacer and a second pin extending from said second end of said spacer;
   said spacer being attached to the first of said cables by having said first pin penetrate radially into said first cable; and
   said spacer being attached to the second of said cables by having said second pin penetrate radially into said second cable.

* * * * *